May 11, 1943.    A. BOYNTON    2,318,590
THREAD LOCK
Filed Nov. 28, 1938    3 Sheets-Sheet 1
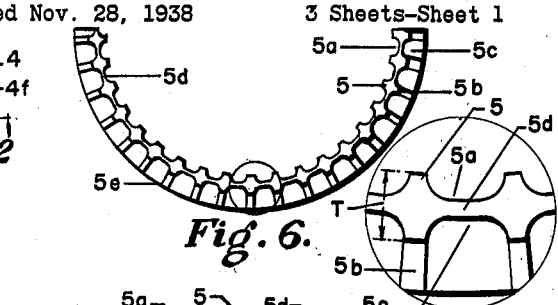
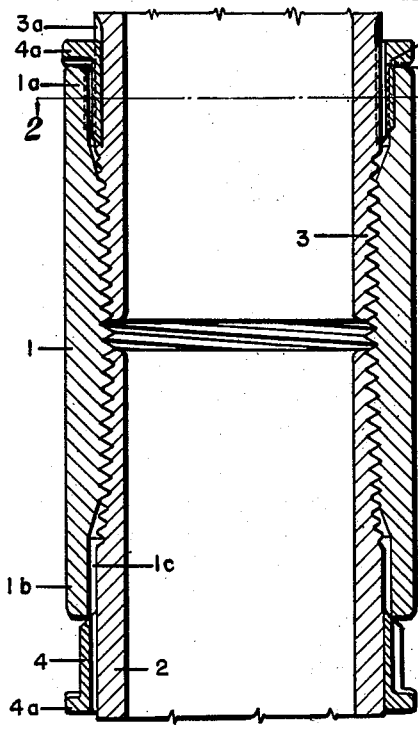
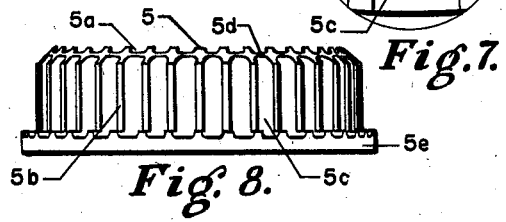
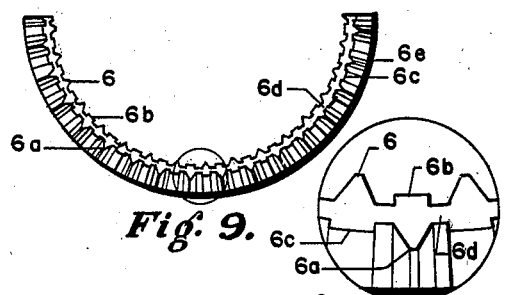
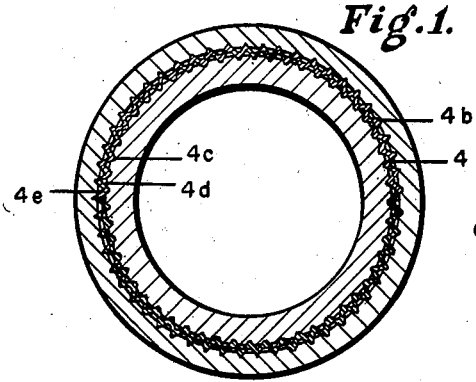
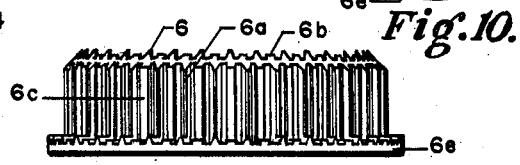
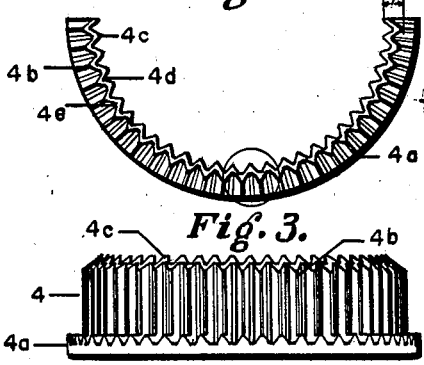
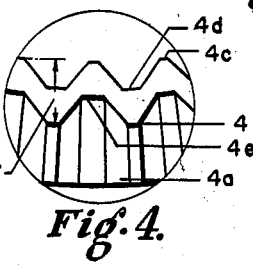
ALEXANDER BOYNTON,
INVENTOR,
BY Jesse R. Stone
Lester B. Clark
ATTORNEYS.

May 11, 1943.　　　A. BOYNTON　　　2,318,590
THREAD LOCK
Filed Nov. 28, 1938　　　3 Sheets-Sheet 2
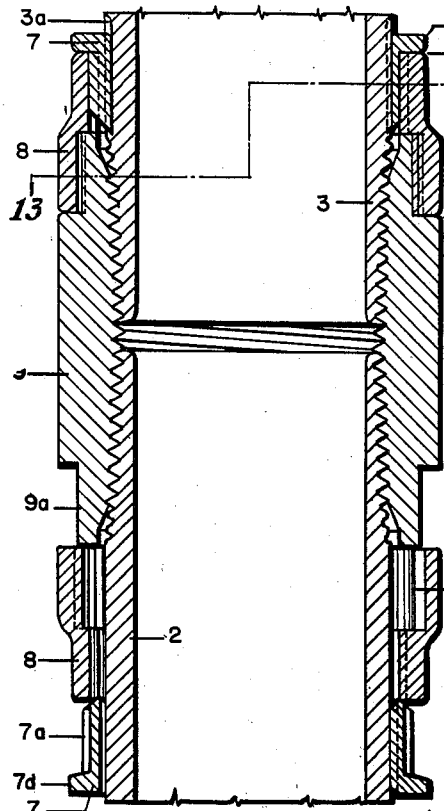
Fig. 12.
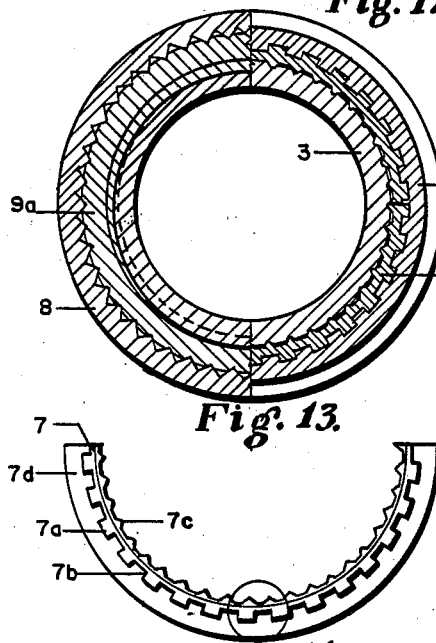
Fig. 13.
Fig. 14.
Fig. 15.
Fig. 16.
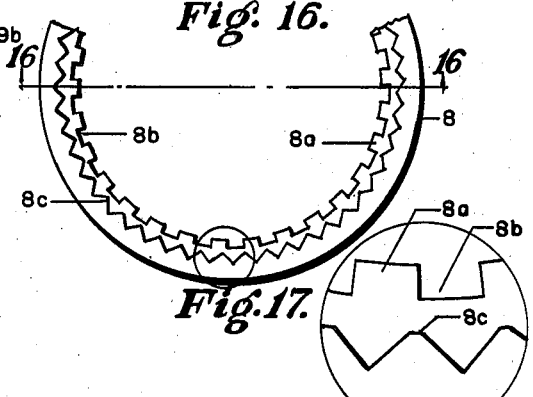
Fig. 17.
Fig. 18.
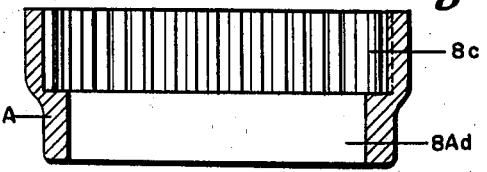
Fig. 19.
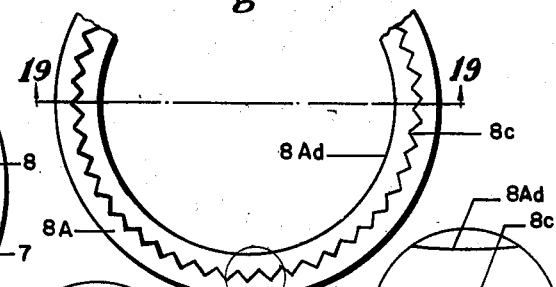
Fig. 20.
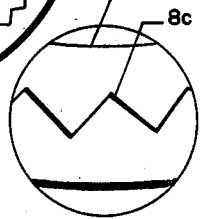
Fig. 21.
ALEXANDER BOYNTON, INVENTOR
BY Jesse R. Stone
Leslie D. Clark
ATTORNEYS.

May 11, 1943.  A. BOYNTON  2,318,590
THREAD LOCK
Filed Nov. 28, 1938  3 Sheets-Sheet 3
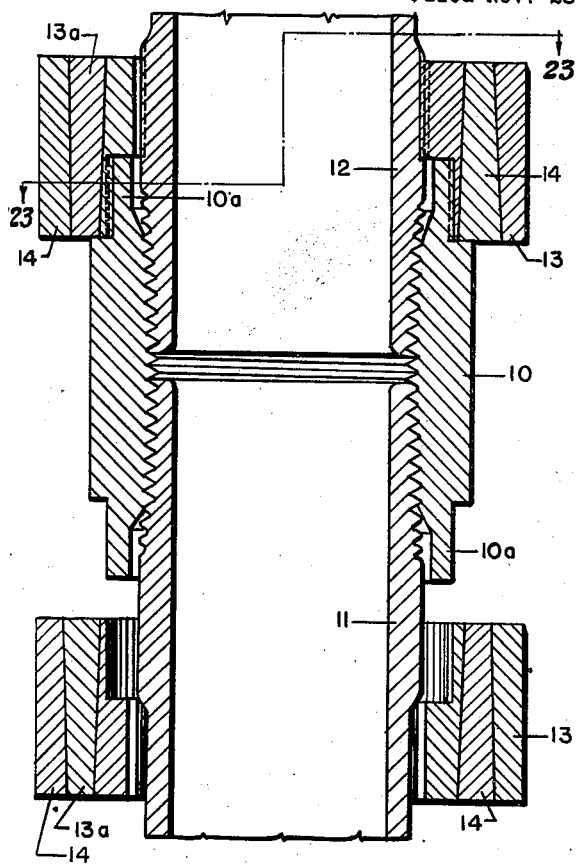
Fig. 22.
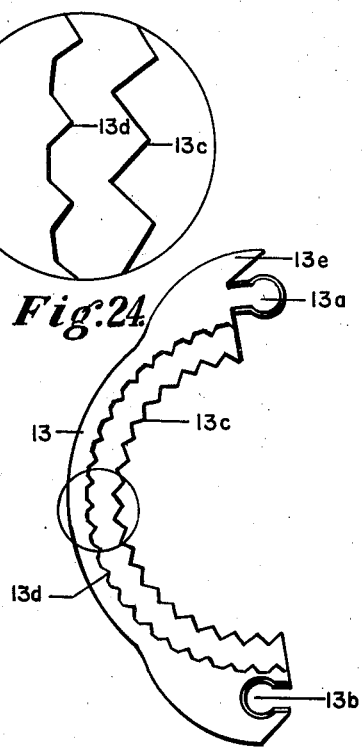
Fig. 24.
Fig. 25.
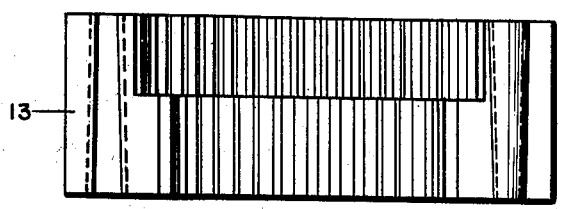
Fig. 26.
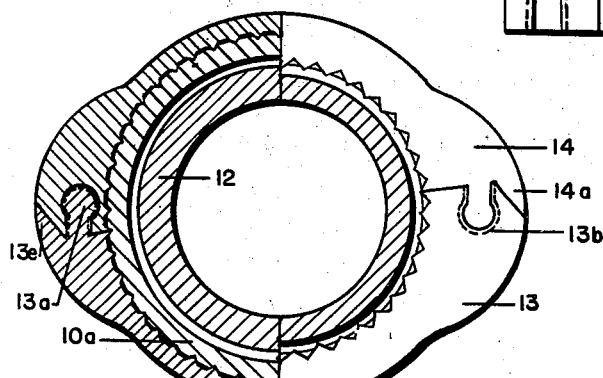
Fig. 23.
ALEXANDER BOYNTON,
INVENTOR.
BY Jesse R. Stone
Lester B. Clark
ATTORNEYS.

Patented May 11, 1943

2,318,590

UNITED STATES PATENT OFFICE 2,318,590

THREAD LOCK

Alexander Boynton, San Antonio, Tex.

Application November 28, 1938, Serial No. 242,778

12 Claims. (Cl. 151—8)

My invention relates primarily to the locking of threads, particularly pipe threads.

The principal object is to prevent tubes and shafts joined together by couplings from becoming unintentionally disjoined or unscrewed.

Another object is to provide a cheaper, quicker, and more economical means of locking the threads of all pipe, especially drill pipe and casing, for the purpose of resisting unscrewing thrusts.

A further object is to prevent drill pipe failures due to great and uneven stresses in and near the threads.

A still further object is to prevent the threads from becoming damaged by being made up with unnecessary force during the drilling operation.

Another object is to provide a thread locking means which can be easily removed at a small fraction of the cost required to turn off welds now used for this purpose.

Conventional drill pipe and tool joints used in drilling wells by the rotary method employ tapered threads. The engagement of tapered threads expands the outer member and contracts the inner member. Friction between the threads and the yieldability of the male and female members determines the depth that the threads will engage. This condition results in great and highly localized stresses which frequently cause drill pipe failures, particularly near the outermost engaged threads.

In drilling wells by the rotary method the drill stem sometimes becomes accidentally unscrewed. A frequent cause of such unscrewing is that when the bit reaches a hard formation it will sometimes become firmly engaged upon this formation and cease rotating for a time while the drill stem continues to rotate and build up torque. This torque soon becomes great enough to overcome the engagement of the bit upon the hard formation. The bit then spins rapidly while the drill stem untwists. When the twist of the drill stem is being relieved by the spinning bit, rotary momentum is built up and the drill stem continues to spin after the torque is spent. This spinning of the bit and drill stem after the torque is spent, builds up torque in the opposite direction which sometimes unscrews the drill stem. To overcome the danger of such unscrewing, couplings and tool joints (a special form of coupling used to join the drill stem together) are frequently welded onto the drill stem.

In setting casing in drilled wells, the casing is never straight. The weight of the casing, especially in deep wells, causes it to bend in many directions, and the deeper the well the sharper and more frequent such bends become.

When the drill stem is inserted into the casing for drilling the well deeper, the weight of the drill stem causes it to develop bends similar to those in the casing. These bends of the drill stem and casing frequently cause the drill stem and casing to bind or lock together with great force. At all joints above such binding or locking the usual right hand or clockwise thrust of the drill stem imparts a left hand or anti-clockwise thrust upon the casing. This frequently unscrews the casing in one or more places entailing great loss and irreparable damage to the well.

I accomplish the foregoing objects in the preferred form of my invention by means of a ring shaped unit having a series of longitudinal teeth or keys adapted to be pressed into the annular opening between each end of the coupling and the pipe or shaft joined together by the coupling. Each unit of the teeth or keys is preferably made in half circle segments to facilitate placing them in position to be pressed in or out. A flange is provided at one end of each unit to facilitate the pressing in or out.

The mechanism by which I attain the foregoing objects is illustrated in the accompanying drawings in which:

Fig. 1 is a longitudinal section of a pipe coupling and ends of the pipe to be locked together showing the thread lock pressed to place at one end of the coupling and in position to be pressed in at the other end of the coupling.

Fig. 2 is a cross section on the line 2—2, Fig. 1.

Fig. 3 is an end view of one of the thread lock segments.

Fig. 4 is an enlarged detail of a portion of the segment shown in Fig. 3.

Fig. 5 is a side elevation of the segment shown in Fig. 3.

Fig. 6 is an end view of a modified form of the segment shown in Fig. 3.

Fig. 7 is an enlarged view of a portion of the segment shown in Fig. 6.

Fig. 8 is a side elevation of the segment shown in Fig. 6.

Fig. 9 is an end view of another modified form of the segment shown in Fig. 3.

Fig. 10 is an enlarged view of a portion of the segment shown in Fig. 9.

Fig. 11 is a side elevation of the segment shown in Fig. 9.

Fig. 12 is a longitudinal section of a coupling and ends of pipe showing another modified form of thread lock pressed to place at one end of the coupling and in position to be pressed in at the other end of the coupling.

Fig. 13 is a section on the line 13—13, Fig. 12.

Fig. 14 is a top view of one of the flanged segments 7 shown proximate the lower end of Fig. 12.

Fig. 15 is an enlarged view of a portion of the segment shown in Fig. 14.

Fig. 16 is a longitudinal section on the line 16—16, Fig. 17.

Fig. 17 is a top view of the member shown in Fig. 16.

Fig. 18 is an enlarged view of a portion of the member shown in Fig. 17.

Fig. 19 is a longitudinal section on line 19—19, Fig. 20.

Fig. 20 is a top view of the member shown in Fig. 19.

Fig. 21 is an enlarged view of a portion of the member shown in Fig. 20.

Fig. 22 illustrates another modified form of the invention, and is a longitudinal section of a pipe coupling and ends of the pipe to be locked together showing the thread lock pressed to place on one end of the coupling and in position to be pressed in at the other end of the coupling.

Fig. 23 is a partial section and plan view on line 23—23, Fig. 22.

Fig. 24 is an enlarged detail of a part of the segment shown in Fig. 25.

Fig. 25 is a segment or half unit of the thread lock shown in Figs. 22 and 23.

Fig. 26 is an elevation of the segment shown in Fig. 25.

Similar reference characters refer to similar parts throughout the several views.

In Figs. 1, 2, 3, 4, and 5 which illustrate what may be considered the preferred form of the invention, tubular joints 2 and 3 are threadedly joined by coupling 1. The coupling end 1b is of such internal diameter as to provide the annular space 1c. Another similar annular space is provided between the coupling end 1a and the pipe 3. The latter space is shown occupied by the thread lock 4 proximate the upper end of Fig. 1.

The unit or complete circle of teeth or keys at each end of the coupling 1 is preferably made in two segments, each formed into a half circle to conform to the exterior of pipes 2 and 3.

The width of the annular space 1c is somewhat less (preferably $\frac{1}{32}$ to $\frac{3}{32}$) than the total thickness T of the segments (Fig. 4) so that upstanding teeth 4b will cut into and become imbedded within the walls of the recess within extensions 1a and 1b, respectively, and so that the upstanding teeth 4c will cut into and become similarly imbedded within the walls of pipes 2 and 3, respectively, when the segments are pressed in as appears proximate the upper end of Fig. 1.

The external troughs 4e may extend across the flange 4a so that the teeth or ribs 4b will be pressed into each end of the coupling 1. In this manner the external and internal teeth or ribs 4b and 4c will have approximately the same length of imbedded engagement.

The troughs 4d should be wide enough and deep enough to provide ample space to receive the metal displaced by the imbedding of teeth 4c. Similarly, the troughs 4e should be wide enough and deep enough to likewise provide room for the displacement of the metal caused by imbedding the teeth 4b. The metal displaced by both sets of teeth will "grow" due to heat generated by forcing in the teeth. The volume of metal displaced by the teeth should ordinarily be approximately ½ the room provided for same in the troughs, although the proportion will vary somewhat with different metals and different methods of forcing the segments into place.

The two segments are installed by placing them above the pipe as shown proximate the lower end of Fig. 1, and pressing them into place as shown proximate the upper end of Fig. 1.

The grooves 3a (Figs. 1 and 12) are merely cuts in the pipe resulting from pressing in the segments.

The space 4f (Figs. 1 and 12) may be used as a starting entrance for a tool to force the thread lock segments out whenever it may be desired to remove them. To facilitate removal, the teeth may be slightly tapered in all forms of the invention.

It will be observed that the teeth 4b are opposite the troughs 4d and that the teeth 4c are opposite the troughs 4e.

Figs. 6, 7, and 8 illustrate the first modified form of the invention, the installation thereof being similar to that of the first form. The internal teeth 5 being opposite the external teeth 5b, and the internal troughs 5a being opposite the external troughs 5c, the latter extending to the periphery of flange 5e.

It will be observed that the webs 5d form a regular curve different from the zigzag shape of the first form as appears by comparing Figs. 3 and 6 and Figs. 5 and 8.

Figs. 9, 10, and 11 illustrate the second modified form of the invention, the installaiton thereof being similar to that of the first and second forms. The internal teeth 6 are opposed by external flat faced extensions 6c extending to the periphery of flange 6e and external teeth 6a, likewise extending to the periphery of flange 6e, are opposed by internal flat faced extensions 6b. The teeth 6 and 6a are similar and extensions 6b and 6c are also similar, as appears. When the segments are forced into place, as shown in Fig. 1, teeth 6 and 6a become imbedded by the force of extensions 6c and 6b, respectively. The webs 6d are flexed alternately, one being forced outward while the next one is forced inward as the teeth 6 and 6a are forced into place.

Figs. 12, 13, 14, 15, 16, 17, and 18 illustrate the third modification of the invention. To assemble as shown in Fig. 12, the ring 8, made in one piece, is pressed upon the turned down portion 9a of coupling 9. In this operation the teeth 8c imbed within the wall of turned down portion 9a. The thread lock unit 7, preferably in two halves, each having a flange 7d, is then pressed in as appears proximate the upper end of Fig. 12. In pressing on the member 7, the inner teeth 7c become imbedded within the outer surface of the pipe, and the keys 7a register with and fit within the keyways 8b of the ring 8. At the same time the keys 8a register with and fit within the keyways 7b. The parts 7 and 8 are shown in position to be pressed into assembled relation proximate the lower end of Fig. 12 and these parts are shown fully assembled proximate the upper end of Fig. 12.

Starting space 9b provides a starting place for a pressing off tool.

Figs. 19, 20, and 21 illustrate a fourth modified form of the invention in which thread lock ring 8A is similar to the part shown in Figs. 16, 17, and 18 except for the smooth surface 8Ad. This ring may be substituted for the ring 8 in Fig. 12. In case of such substitution either of the thread lock members shown in Figs. 5, 8, and 11 may be used in place of the part 7 in Fig. 12.

Figs. 22, 23, 24, 25, and 26 illustrate a fifth modified form of the invention in which the segments 13 and 14 are put together by lock pin 13a and lock pin slot 13b engaging mating parts of the member 14. The lips 13e and 14a engage mating surfaces upon the other segment as appears in Fig. 23. The teeth 13c imbed within the pipe, and the teeth 13d imbed within the surface 10a of coupling 10. Pipes 11 and 12 are externally upset or enlarged proximate the ends. When the two segments 13 and 14 are assembled below the upset enlargement, as shown proximate the lower end of Fig. 22, the segments are ready to be pressed into place as shown at the upper end of Fig. 22. The lock pin 13a and lock pin slot 13b may each taper slightly so that each will engage its mating part firmly when the segments are moved opposite each other as may be observed at the lower end of Fig. 22.

The object in making this form of thread lock in halves is to provide that the two parts may be assembled around the pipe without having to remove the coupling from the other end of the joint and also press the thread lock over the other upset end, as would be necessary if the thread lock unit were not made in halves.

Each form of this thread lock may be made to resist the unscrewing thrust of pipe with such force that the pipe will be twisted in two before the thread lock will become disengaged.

Ordinary pipe couplings may often be used by making the dimension T (Figs. 4 and 7) of proper thickness. The teeth or keys will be found satisfactory in many cases if they will imbed or engage to a depth of 1/64" to 3/64" by a length of 1/2" to 1", although it will be understood that the dimensions of the pipe and couplings will have much to do with exact sizes and proportions of the thread lock parts. The slight extra expense of special couplings is, however, so small compared to the present cost of welding pipe joints that it will be frequently found advantageous to use such couplings in order to provide for proper length and thickness of the locking teeth.

It is apparent that a great number of minor changes in design and construction can be made without departing from the scope and purpose of this invention as illustrated by the drawings and covered by the appended claims.

I claim:

1. A locked joint comprising an end to end threaded connection between a pair of tubular members, the end of one of the members concentrically surrounding the other of the members, one of the members being reduced in cross section to form a recess therebetween, and arcuate thread lock segments filling said recess and having staggered inwardly and outwardly extending tapered teeth displacing metal from the opposed surfaces and entering the recesses formed thereby.

2. A locked joint comprising an end to end threaded connection between a pair of tubular members, the end of one of the members concentrically surrounding the other of the members, one of the members being reduced in cross section to form a recess therebetween, and arcuate thread lock segments filling said recess and having staggered inwardly and outwardly extending tapered teeth displacing metal from the opposed surfaces and entering the recesses formed thereby, said thread lock segments having an outwardly extending flange in engagement with the end of the outer tubular member.

3. A locked joint comprising two tubular members, a threaded connection between the members, an annular recess between the members, and thread lock segments in said recess, said thread lock segments being circularly arranged about the members and having radially, oppositely extending inner and outer teeth extending axially thereof and imbedded in the surfaces of the tubular members so as to displace metal from said surfaces and to enter the recesses formed thereby, and a flange on the segments having radial teeth engaging the end of the outer of said members.

4. A locked joint comprising two tubular members, a screw threaded connection between said members, an annular recess between said members, and arcuate thread lock segments in said recess and engaging each of the members whereby the members are locked against relative rotation, said segments having longitudinal and transverse teeth displacing metal from the opposed surfaces of the members and entering the recesses formed thereby.

5. A locked joint comprising a tubular member and a coupling threadably connected to the end thereof, a ring having a first portion surrounding the tubular member and in spaced relation therewith to form an annular recess, said ring also having a second and internally enlarged portion surrounding the end of the coupling and having longitudinal inwardly extending teeth imbedded in the surface of the coupling, and a lock segment within said recess, said segment having inwardly extending teeth imbedded in the surface of the tubular member, said segment also having outwardly extending keys fitting within complementary keyways in the first portion of said ring, there being a slight taper in said teeth and keys.

6. A locked joint comprising a tubular member, a coupling threadably connected to the end thereof, a ring surrounding the tubular member and having an enlarged portion surrounding the end of the coupling, said enlarged portion having longitudinal inwardly extending teeth imbedded in the surface of the coupling, said ring also having a portion surrounding the tubular member and in spaced relation therewith to form a recess therebetween, and a lock segment within said recess and in engagement with the ring and tubular member respectively whereby an interlock between the tubular member and the coupling is provided, said teeth and keys having a slight taper to provide clearance as the members approach completely engaged position.

7. A locked joint comprising a pair of threadably interconnected tubular members, a pair of lock segments surrounding said members, each of said segments having inner stepped surfaces provided with inwardly extending teeth imbedded in the surface of each of the members, and a complementary lock pin and a lock pin slot in adjacent ends of the segments in mating engagement to hold the segments in position to lock the tubular members against relative rotation.

8. A locked joint comprising a coupling, a tubular member threadably connected thereto, a lock ring surrounding said member and a portion of said coupling and having stepped inner surfaces provided with inwardly extending teeth imbedded in the surface of each member and the coupling to lock the member and coupling against relative rotation.

9. A locked joint comprising a pair of tubular members threadably interconnected so that the end of one of the members surrounds the end of the other member, and a thread lock member having longitudinally tapered teeth imbedded in the surface of each of the tubular members so as to displace metal from said surface and to enter the recesses formed thereby so that the interconnected tubular members are locked against relative rotation.

10. A locked joint comprising a pair of tubular members in end to end relation and threadably interconnected through a surrounding coupling, and thread lock members at opposite ends of the coupling and in fixed relation thereto, said thread lock members having longitudinally tapered teeth imbedded in the surface of the coupling and of the adjacent tubular member so as to displace metal from said surfaces and to enter the recesses formed thereby, whereby the tubular members are restrained from relative rotation.

11. A locked joint comprising two tubular members, a threaded connection between the members, an annular recess between the members, thread lock segments in said recess, having inner and outer longitudinally tapered teeth extending axially thereof and imbedded in the surfaces of the tubular members so as to displace metal from said surfaces and to enter the recesses formed thereby, and a flange having radial teeth adapted to be imbedded within the end of the outer of said members, the ends of said last mentioned teeth being formed into an annular chisel-like surface.

12. A locked joint comprising a pair of tubular members in end to end relation and threadedly interconnected through a surrounding coupling, and thread lock members at opposite ends of the coupling and in fixed relation thereto, said thread lock members having oppositely positioned longitudinally tapered teeth imbedded in the surface of each the coupling and the adjacent tubular member so as to displace metal from said surface and to enter the recesses formed thereby, whereby the tubular members are restrained from relative rotation, the teeth of said threadlock members being longitudinally tapered and having one end formed into an annular chisel-like surface.

ALEXANDER BOYNTON.